US011604987B2

(12) United States Patent
Van Baalen et al.

(10) Patent No.: US 11,604,987 B2
(45) Date of Patent: Mar. 14, 2023

(54) ANALYTIC AND EMPIRICAL CORRECTION OF BIASED ERROR INTRODUCED BY APPROXIMATION METHODS

(71) Applicant: QUALCOMM Incorporated, San Diego, CA (US)

(72) Inventors: Marinus Willem Van Baalen, Amsterdam (NL); Tijmen Pieter Frederik Blankevoort, Amsterdam (NL); Markus Nagel, Amsterdam (NL)

(73) Assignee: Qualcomm Incorporated, San Diego, CA (US)

( * ) Notice: Subject to any disclaimer, the term of this patent is extended or adjusted under 35 U.S.C. 154(b) by 431 days.

(21) Appl. No.: 16/826,472

(22) Filed: Mar. 23, 2020

(65) Prior Publication Data

US 2020/0302298 A1 Sep. 24, 2020

Related U.S. Application Data

(60) Provisional application No. 62/822,266, filed on Mar. 22, 2019.

(51) Int. Cl.
*G06N 3/08* (2006.01)
*G06N 3/04* (2006.01)

(52) U.S. Cl.
CPC ............ *G06N 3/08* (2013.01); *G06N 3/04* (2013.01)

(58) Field of Classification Search
CPC .................. G06N 3/08; G06N 3/04
See application file for complete search history.

(56) References Cited

U.S. PATENT DOCUMENTS

| 5,590,243 | A | * | 12/1996 | Akimoto | G06N 3/04 706/31 |
|---|---|---|---|---|---|
| 2016/0328646 | A1 | * | 11/2016 | Lin | G06V 10/454 |
| 2019/0042945 | A1 | * | 2/2019 | Majumdar | G06N 3/04 |
| 2019/0227893 | A1 | * | 7/2019 | Imber | G06N 3/063 |
| 2019/0340492 | A1 | * | 11/2019 | Burger | G06N 3/08 |
| 2020/0193274 | A1 | * | 6/2020 | Darvish Rouhani | G06N 3/084 |

(Continued)

OTHER PUBLICATIONS

Jacob, Benoit, et al. "Quantization and training of neural networks for efficient integer-arithmetic-only inference." Proceedings of the IEEE conference on computer vision and pattern recognition. 2018. (Year: 2018).*

(Continued)

*Primary Examiner* — Utpal D Shah
(74) *Attorney, Agent, or Firm* — The Marbury Law Group

(57) ABSTRACT

Various embodiments include methods and neural network computing devices implementing the methods, for generating an approximation neural network. Various embodiments may include performing approximation operations on a weights tensor associated with a layer of a neural network to generate an approximation weights tensor, determining an expected output error of the layer in the neural network due to the approximation weights tensor, subtracting the expected output error from a bias parameter of the layer to determine an adjusted bias parameter and substituting the adjusted bias parameter for the bias parameter in the layer. Such operations may be performed for one or more layers in a neural network to produce an approximation version of the neural network for execution on a resource limited processor.

29 Claims, 8 Drawing Sheets

(56) References Cited

U.S. PATENT DOCUMENTS

| | | | | |
|---|---|---|---|---|
| 2020/0265301 A1* | 8/2020 | Burger | ............... | G06N 5/04 |
| 2020/0293889 A1* | 9/2020 | Terasaki | ............ | G06N 3/063 |
| 2020/0382228 A1* | 12/2020 | Studer | ............ | H04B 17/364 |
| 2021/0192349 A1* | 6/2021 | Lian | ............ | G06N 3/04 |

OTHER PUBLICATIONS

Krishnamoorthi, Raghuraman. "Quantizing deep convolutional networks for efficient inference: A whitepaper." arXiv preprint arXiv: 1806.08342 (2018). (Year: 2018).*

\* cited by examiner

ANALYTIC AND EMPIRICAL CORRECTION OF BIASED ERROR INTRODUCED BY APPROXIMATION METHODS

RELATED APPLICATIONS

This application claims the benefit of priority to U.S. Provisional Application No. 62/822,266 entitled "Systems And Methods For Analytical Bias Correction For Quantization And Compression Approximation Errors" filed Mar. 22, 2019, the entire contents of which are incorporated herein by reference for all purposes.

BACKGROUND

Deep neural networks are used heavily on mobile devices for a variety of tasks, including scene detection, facial recognition, image sorting and labeling. Convolution is frequently used for deep neural networks to accomplish these tasks, and is usually implemented using matrix multiplication. Prediction models and deep neural network models are trained on computing devices that have high computational resources (e.g., energy, floating point operations per second (FLOPS, etc.) and precision architecture capable of 32-bit floating point (FP32) computations or operations. Yet, many hardware systems, particularly those used in mobile and wireless devices, have limited processing resources (e.g., limited energy or FLOPS) and/or have a small bit-width processing architecture (e.g., optimized for 8-bit integer (INT8) computations or operations). Converting prediction models and deep neural network models to run on processors with limited processing resources and/or a small bit-width computing/processing architecture involves approximation (e.g., compression or quantization) of weights in the model, which can result in biases or errors, such as through rounding errors.

SUMMARY

Various aspects include methods and computing devices implementing such methods for generating an approximation of a neural network correcting for analytical bias from approximation errors. Various aspects may include performing approximation operations on a weights tensor associated with a layer of a neural network to generate an approximation weights tensor, determining an expected output error of the layer in the neural network due to the approximation weights tensor, subtracting the expected output error from a bias parameter of the layer to determine an adjusted bias parameter, and substituting the adjusted bias parameter for the bias parameter in the layer. Some aspects may further include repeating operations of performing approximation operations on the weights tensor associated with a layer of the neural network, determining an expected output error of the layer of the neural network, subtracting the expected output error from a bias parameter of the layer to determine an adjusted bias parameter, and substituting the adjusted bias parameter for the bias parameter in the layer for all layers in the neural network to generate the approximation of the neural network.

In some aspects, determining an expected output error of the layer in the neural network due to the approximation weights tensor may include determining an approximation weights tensor error based on a difference between an original weights tensor and the approximation weights tensor.

In some aspects, determining an expected output error of the layer in the neural network may include for each preceding layer that provides input to the layer: determining whether the preceding layer includes an activation function after batch normalization, and determining an expected input of the layer based on learnable batch normalization parameters of the preceding layer in response to determining that the preceding layer does not include an activation function after batch normalization. In some aspects, the learnable batch normalization parameters may include a batch normalization shift parameter.

In some aspects, determining an expected output error of the layer in the neural network may include for each preceding layer that provides input to the layer: determining whether the preceding layer includes an activation function after batch normalization, determining whether the activation function is a clipped linear activation function in response to determining that the preceding layer includes an activation function after batch normalization, and applying rules for truncated normal distributions adapted to account for a probability mass outside of a clipped range in response to determining that the activation function is a clipped linear activation function. In some aspects, determining an expected output error of the layer in the neural network may include for each preceding layer that provides input to the layer: determining an expected mean, variance or standard deviation of the activation of the preceding layer based on learnable batch normalization parameters of the preceding layer, and determining an expected input of the layer based on the determined expected mean, variance or standard deviation.

In some aspects, determining an expected output error of the layer in the neural network may include for each preceding layer that provides input to the layer: determining whether the preceding layer includes batch normalization, and determining whether the preceding layer is a result of a residual connection in response to determining that the preceding layer does not include batch normalization, and determining the preceding layer's expected output based on the equation $E[xout]=E[xin]+E[xlast]$ for each preceding layer that provides input to the layer in response to determining that the preceding layer is the result of a residual connection. In some aspects, determining an expected output error of the layer in the neural network may include determining for each preceding layer that provides input to the layer a mean, variance or standard deviation of activations of the preceding layer based on a result of feeding data through the neural network in response to determining that the preceding layer is not the result of a residual connection.

Further aspects may include a computing device configured to perform operations of any of the methods summarized above. Further aspects may include a non-transitory processor-readable medium having stored thereon processor-executable instructions configured to cause a computing device to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
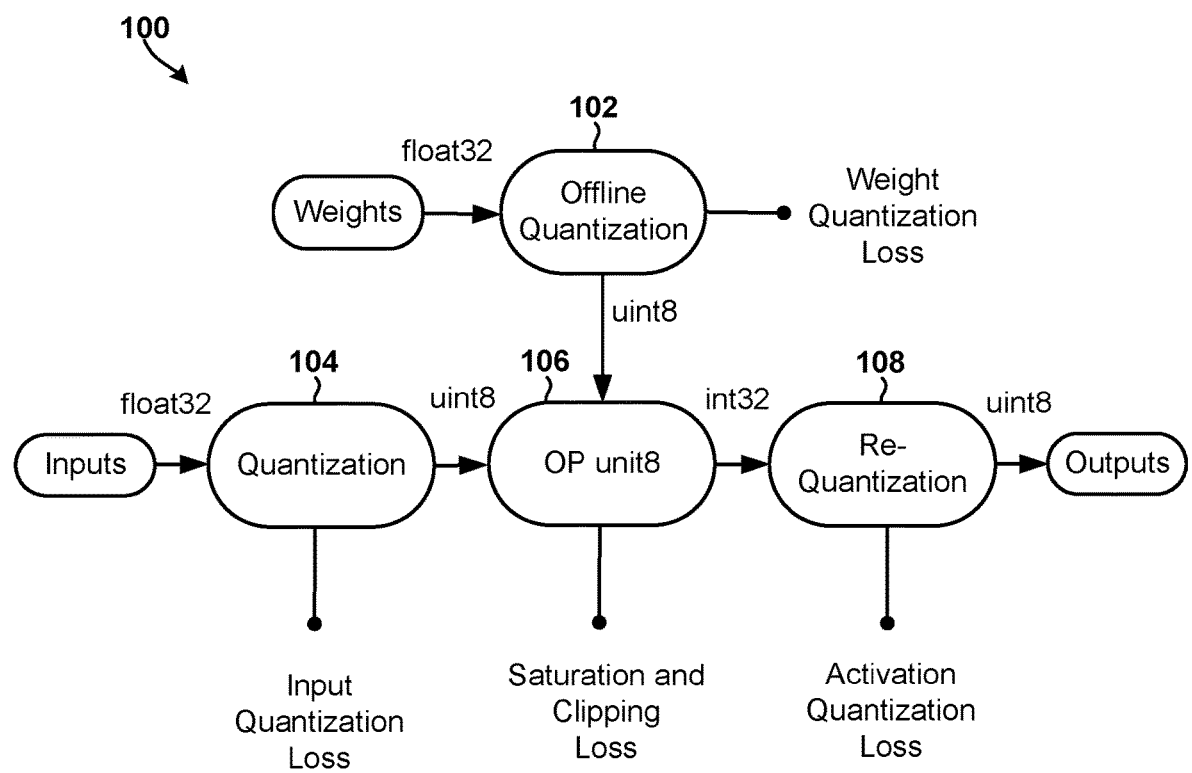
FIG. 1 is a component block diagram illustrating an example software implemented fixed-point quantized pipeline that may benefit from performing analytical bias correction operations in accordance with the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Neural networks trained to perform various functions on a target computing device (e.g., a mobile device) are often generated by a computer learning environment (CLE) that trains a neural network using a training data set. A CLE computing device may have a precision or "bit-width" (e.g., capable of 32-bit floating point (FP) operations) as well as processing resources (e.g., energy, FLOPS, etc.) great than the precision or bit-width and processing resources of the target computing device on which the trained neural network will be implemented.

To enable execution on target computing devices with fewer processing resources (e.g., energy, FLOPS, etc.) or a processor architecture having a bit-width smaller than the bit-width architecture of the CLE computing device, trained neural networks are transformed by approximating weight values of the neural network. Approximation techniques are used to either represent a weight tensor using low bit-width fixed-point datatypes (e.g. converting from the usual 32-bit floating point to 8 bit integer), which allows the use of low bit-width computations (less power consumption, lower latency), or lower the number of parameters in a weight tensor through compression, which leads to reduced MAC operations for the associated operation (e.g. convolutional or linear layer in a neural network). Both quantization and compression reduce the amount of data transfer when using a neural network, which reduces latency and power consumption.

Various embodiments include methods, and computing devices configured to implement the methods, for performing analytical bias correction for errors introduced when converting neural network models into approximation neural network models that are suitable for operating on a processor with limited processing resources and/or a small bit-width architecture. The operations of the various embodiments improve the performance of neural networks executing on limited resource computing devices by reducing errors resulting from post-training approximations.

The term "computing device" is used herein to refer to any one or all of servers, personal computers, mobile device, cellular telephones, smartphones, portable computing devices, personal or mobile multi-media players, personal data assistants (PDA's), laptop computers, tablet computers, smartbooks, IoT devices, palm-top computers, wireless electronic mail receivers, multimedia Internet enabled cellular telephones, connected vehicles, wireless gaming controllers, and similar electronic devices which include a memory and a programmable processor.

The term "neural network" is used herein to refer to an interconnected group of processing nodes (e.g., neuron models, etc.) that collectively operate as a software application or process that controls a function of a computing device or generates a neural network inference. Individual nodes in a neural network may attempt to emulate biological neurons by receiving input data, performing simple operations on the input data to generate output data, and passing the output data (also called "activation") to the next node in the network. Each node within a layer of a neural network may be associated with a weight value that defines or governs the relationship between input data and activation. The set of weights in a layer of a neural network is referred to as a weights tensor. The weight values may be determined during a training phase and iteratively updated as data flows through the neural network.

The term "approximation operations" is used to refer generally to quantization operations, compression operations and other methods of approximating a neural network model trained on a computing device with greater processing resources and a large bit-width architecture for execution on a computing device with limited processing resources and/or a small bit-width architecture. The difference between an original value and its approximation value is referred to as an approximation error.

The term "compression" is used herein to refer to approximation techniques for reducing the number of parameters in a weight tensor through compression, which leads to reduced MAC operations for the associated operation (e.g. convolutional or linear layer in a neural network). The difference between an original value and its compressed value may be referred to as a compression error.

The term "quantization" is used herein to refer to approximation techniques for mapping input values of a first level of precision (i.e., number of bits) to output values in a second, lower level of precision (i.e., smaller number of bits). Quantization is an example method that may be used for converting 32-bit weights and activations determined through training of a 32-bit neural network model on a 32-bit architecture CLE into 8-bit weights and activations for execution on 8 bit-width architecture processors. The difference between an original value and its quantized value is referred to as a quantization error.

As the various embodiments include methods for improving the approximation (e.g., quantization, compression, etc.) of neural network models into neural network models suitable for execution on processors with limited processing resources and/or a small bit-width architecture, the relative words "large" and "larger" are used herein to refer to the original (pre-approximation) neural network and the relative words "small" and "smaller" are used herein to refer to the approximated neural network. The term "large bit-width" refers to the bit-width of the original neural network model and the precision or architecture of the CLE computing device that trains the neural network, and the term "small bit-width" refers to the bit-width of the target computing device and the approximated neural network. For example, a "large bit-width" neural network may have 32-bit (or larger) values in the weights tensors, and the "small bit-width" approximated version of the neural network may have 8-bit values in the weights tensors.

Deep neural networks implement a layered architecture in which the activation of a first layer of nodes becomes an input to a second layer of nodes, the activation of a second layer of nodes becomes an input to a third layer of nodes, and so on. As such, computations in a deep neural network may be distributed over a population of processing nodes that make up a computational chain. Deep neural networks may also include activation functions and sub-functions (e.g., a rectified linear unit that cuts off activations below zero, etc.) between the layers. The first layer of nodes of a deep neural network may be referred to as an input layer. The final layer of nodes may be referred to as an output layer. The layers in-between the input and final layer may be referred to as intermediate layers, hidden layers, or black-box layers.

Each layer in a neural network may have multiple inputs, and thus multiple previous or preceding layers. Said another way, multiple layers may feed into a single layer. For ease of reference, some of the embodiments are described with reference to a single input or single preceding layer. However, it should be understood that the operations disclosed and described in this application may be applied to each of multiple inputs to a layer as well as multiple preceding layers.

Many application development platforms and server computing devices utilize a large bit-width format (e.g., Floating point or FP32) for data, and neural networks are often trained in powerful servers with large computing resources (e.g., energy, FLOPS, etc.) and large bit-width architectures. On the other hand, resource constrained devices, such as smartphones and other mobile devices, may have limited computing resources and/or a small bit-width (e.g., INT8) architecture, and an increasing number of hardware manufactures have begun adding support for optimized eight-bit integer operations that better support neural networks and other systems that sequentially perform a large number of relatively simple computations.

Compression and quantization are two example approximation techniques that may be used to transform a neural network model trained on a large bit-width computing device with large computing resources into a neural network model that can be executed on resource limited computing devices and/or a small bit-width architecture. For example, compression and/or weights tensor factorization techniques may be used to approximate a weights tensor through factorization, which may reduce the total number of MAC operations performed by the client computing device in which the neural network is deployed.

While these approximation techniques may improve the overall performance or efficiency of the neural networks and client computing devices, they could also introduce weights tensor and output/activation errors in the neural network layers. For example, there may be a significant numerical difference between the parameters in the trained neural network model and equivalent approximation neural network model, as well as between intermediately stored values between layer computations. The numerical difference in a given layer may be a weights tensor error (e.g., weights tensor error, activation weights tensor error, etc.) that causes the layer to generate an incorrect or imprecise output. Since, in a neural network, the output of one layer is often the input to a subsequent layer, an output/activation error in one layer could compound over consecutive layers and have a significant negative impact on the efficiency, performance or functioning of the neural network executing on the computing device.

Conventional solutions attempt to mitigate the effects of such errors by retraining or fine-tuning an approximated model/weights tensor. However, such retraining and fine-tuning operations require access to representative datasets and/or significant computational resources, which may not be readily available on the computing devices in which the neural network is deployed. For example, resource constrained computing devices, such as smartphones, may not have sufficient processing, memory or battery resources to retrain or fine-tune a model/weights tensor. In cloud-based systems, and other systems in which the owner of a model and the owner of the hardware are different, the client computing device may not have access to the dataset required to retrain or fine-tune the models/weights tensors.

Various embodiments include methods, and computing devices configured to implement the methods, for performing analytical bias correction operations that mitigate the effects of the output/activation errors associated with compression, quantization or other approximations without retraining or fine-tuning the models/weights tensors, and without having a significant negative impact on the performance of the neural network or the client computing device on which it is installed. A computing device configured to implement the analytical bias correction methods in accordance with various embodiments may determine or identify an original weights tensor associated with a layer in a neural network, determine an approximated weights tensor associated with the layer, compute the difference between the original weights tensor and the approximated weights tensor, and determine a weights tensor error based on the difference between the original weights tensor and the approximated weights tensor. In some embodiments, the computing device may compute expected pre-activation outputs produced by the original weights and pre-activation outputs produced by the approximated weights tensor using batches of data, and the computing device may compute a correction factor to the layer bias parameter based on the difference with the correction factor appropriately adapted for convolutional or fully connected layers. The computing device may also determine or receive expected input for the layer, which may be performed independently or in parallel with the above-operations for determining the approximated weights tensor and/or weights tensor error. The computing device may determine an expected output error by applying an expected input to weights tensor error, and subtract the expected output error from pre-activations to generate corrected pre-activation information (e.g., for use by the activation function associated with that layer, etc.). In some embodiments, the computing device may also be further configured to apply an activation function to corrected pre-activation.

In some embodiments, the computing device may be configured to perform approximation operations (e.g., compression, quantization, etc.) on weights tensors associated with each layer in a neural network. These operations may result in an approximated weights tensor that includes a weights tensor error, which is an error in the output of layer due to a loss in precision of the weights. Such errors cannot be removed simply by adjusting the approximated weights tensor because the weights tensor error may be biased or the mean of the activation distribution of the layer may change, resulting in an incorrect adjustment and/or further activation errors. To preserve the original mean of a layer, and thus reduce incorrect adjustments and/or further activation errors, a computing device configured to perform analytical bias correction operations in accordance with various embodiments may determine an expected input for a layer, apply the expected input to the weights tensor error to generate an expected error, and subtract the expected error from layer's bias parameter so that the correction is applied to the input to the layer prior to the activation function being applied. An approximation of the neural network configured in this manner may then be loaded or implemented on hardware of a small bit-width computing device.

The computing device may be configured to determine the expected inputs of the current layer of the neural network based on the expected outputs of one or more of its previous or preceding layers (e.g., the layers immediately preceding the current layer, etc.).

In some embodiments, the computing device may be configured to select a preceding layer that provides input to the current layer, and determine whether the preceding layer includes batch normalization (BN), which may be a function, component or process that normalizes the inputs of the layers, including the typically rapidly changing inputs of hidden or intermediate layers, to reduce or eliminate challenges associated with internal covariate shift, etc. The computing device may also determine whether the preceding layer includes an activation function after the batch normalization, and whether the activation function after batch normalization (if any) is a clipped-linear activation function. The computing device may perform these and the other operations discussed in this application for each preceding layer that provides an input to the current layer.

In response to determining that a preceding layer includes batch normalization but no activation function after the batch normalization, the computing device may determine the expected output/activation of the preceding layer (and the expected input of the current layer) based on the preceding layer's learning batch normalization parameters. For example, the computing device may determine or set the expected input of the current layer based on one or more of the preceding layer's learning batch normalization parameters, such as the preceding layer's batch normalization shift parameter. The batch normalization shift parameter ($\beta$) may be a value used during the batch normalization operations to obtain the output of a layer, and is discussed in more detail further below.

In response to determining that the preceding layer includes batch normalization and a clipped-linear activation function after the batch normalization, the computing device may perform clipped normal correction of a truncated normal (e.g., a value representing a truncated normal distribution) to compute mean and variance (or standard deviation) values from the preceding layer's learnable batch normalization parameters (learnable BN parameters), and use these computed values to determine or set the expected input of the current layer. Said another way, if the preceding layer includes a clipped-linear activation function, the computing device may determine the mean and variance of the preceding layer's output/activation by applying rules for truncated normal distributions adapted to account for the probability mass outside of the clipped range, and use the mean and variance values to determine an expected input of the current layer.

In response to determining that the preceding layer includes batch normalization and an activation function other than the clipped-linear activation function after batch normalization (i.e., the activation function is not a clipped-linear activation function), the computing device may compute expected mean and variance values (and the expected output/activation of the preceding layer, the expected input of the current layer, etc.) based on the preceding layer's learnable batch normalization parameters.

In response to determining that the preceding layer does not include batch normalization, the computing device may determine whether the preceding layer is a result of a residual connection. In response to determining that the preceding layer is a result of a residual connection, the computing device may determine the preceding layer's expected output/activation based on the equation $E[x_{out}]=E[x_{in}]+E[x_{last}]$, where $x_{out}$ is the output of the residual block, $x_{in}$ is the input to the residual block, and $x_{last}$ is the output of the last layer in the residual block. This equation is discussed in more detail further below.

In response to determining that the preceding layer does not include batch normalization and is not a result of a residual connection, the computing device may use any of a variety of methods to determine the expected output of preceding layer, such as by feeding data through the network to determine the mean and variance of the activations of the preceding layer.

As mentioned above, when approximating a weights tensor in a neural network using approximation (e.g., quantization, compression, etc.) techniques, an error is introduced on the weights, which introduces error on the resulting activations. For a convolution layer with weights tensor W, approximated weights $\tilde{W}$, input activations x, output activations y=W*x, and output activations affected by weight error on the weights $\tilde{y}$, the following relationships apply:

$$\tilde{y} = \tilde{W} * x$$
$$= (W + \epsilon) * x$$
$$= W * x + \epsilon * x$$
$$= y + \epsilon * x$$
$$\text{Therefore } y = \tilde{y} - \epsilon * x$$

where the approximation error $\epsilon=\tilde{W}-W$, and there is access to both the original weights tensor and its approximated counterpart.

To account for this error, a computing device may compute the expectation $E[\epsilon*x]=E[\epsilon]*E[x]$. As the computing device computes a from W and W, a becomes a constant such that $E[\epsilon*x]=\epsilon*E[x]$. This equation is based on taking the expectation $E[x]$ over all pixels in a channel and the expectation being the same for each pixel in a channel.

Defining $z=\epsilon*E[x]$ and employing the supposition $E[x]$ is the same for all pixels i, j in a channel $c_{in}$, yields:

$$z_{c_{out}ij} = (\epsilon * \mathbb{E}[x])_{ij}$$
$$= \sum_{c_{in}mn} (\epsilon_{c_{out}c_{in}mn} \mathbb{E}[x_{c_{in},i-m,j-n}])$$
$$= \sum_{c_{in}} \left( \mathbb{E}[x_{c_{in}}] \sum_{mn} \epsilon_{c_{out}c_{in}mn} \right)$$

which provides the same result for each output pixel $z_{cij}$. Therefore, z can be represented as a $C_{out}$ dimensional vector.

The value of z can be used to correct the output activations affected by weight error on the weights $\tilde{y}$ for the bias in the approximation error of weights tensor W by correcting $\tilde{y}$ to $\tilde{y}'$:

$\forall_{ij} \tilde{y}'_{cij} = \tilde{y}_{cij} - z_c$

This operation ensures that $E[\tilde{y}'_{cij}] = E[y_{cij}]$ and thus corrects for the biased error on the weights. Since the bias correction term is the same for each pixel in a channel, this term can be folded into the layer's bias parameter. Thus, for implementation in an approximated neural network for execution on a resource limited computing device, the expect error can be subtracted from the layer's bias parameter within the neural network model.

For fully connected layers, a correction term $z_j$ can be computed for each output unit j:

$$z_j = (\epsilon E[x])_j$$
$$= \sum_i (\epsilon_{ji} E[x_i])$$

and thus $$\tilde{y}'_j = \tilde{y} - z_j$$

In case the model uses batch normalization (assuming the batch normalization parameters to be folded into the weights tensor), the batch normalization parameters of the preceding layer(s) can be used to compute E[x].

In some embodiments, a mathematically equivalent method may be implemented using expected pre-activation outputs of an original model and a model to which an approximation has been applied. In such embodiments, the computing device may compute expected pre-activation outputs E[y] produced by the original weights W and pre-activation outputs E[ỹ] produced by the approximated weights $\tilde{W}$, using batches of data. The same data should be use for computing both E[y] and E[ỹ]. Then, the computing device may compute a correction factor for the layer bias parameter based on the difference, such as z=E[ỹ]−E[y], with the correction factor appropriately adapted for convolutional or fully connected layers. Mathematically the results may be equivalent because:

$$\mathbb{E}[\tilde{y}] - \mathbb{E}[y] = (W+\epsilon) * \mathbb{E}[x] - W * \mathbb{E}[x] = \epsilon * \mathbb{E}[x] = z.$$

For a clipped normal distribution, the pre-activation outputs of a layer can be assumed to be normally distributed, batch normalization can be applied before the activation function, and the activation function can be some form of the class of clipped linear activation functions. Examples of clipped linear activation functions are a Rectified Linear Unit (ReLU) function and the Rectified Linear 6 (ReLU6) function, which clip the input range to the range [a; b] by limiting the range to greater than the value "a" but less than the value "b") where a<b, and b can be infinity ("inf" or ∞). For example, in the ReLU function a=0 and b=infinity.

Due to the centralization and normalization applied by batch normalization, the mean and standard deviation of the pre-activations are known as these are the batch normalization scale and shift parameters, henceforth referred to as γ and β, respectively.

Computing E[x] from the preceding layer's batch normalization parameters may take into account the preceding layer's activation function, in which case the rules for computing the mean and variance of the truncated normal distribution could be adopted by accounting for the probability mass for x<a and x>b.

For purposes of shorthand notation, the following derivation uses $\mu^c_{ab}$ and $\sigma^c_{ab}$ to denote the mean and standard deviation of the $\mathcal{N}(\mu, \sigma^2)$ clipped to range (a, b), and $\mu^t_{ab}$ and $\sigma^t_{ab}$ to denote the mean and standard deviation of $\mathcal{N}(\mu, \sigma^2)$ truncated to (a, b). $\mathcal{N}(\mu, \sigma^2)$ is the normal distribution with mean mu and standard deviation sigma. Further, the following derivation defines α=(a−μ)/σ, β=(b−μ)/σ, and Z=Φ(β)−Φ(α), where Φ is the cumulative density function (CDF) for $\mathcal{N}(\mu, \sigma^2)$. Further, the following derivation uses the notation $\mathcal{N}(x)$ to denote the probability distribution function $\mathcal{N}(0, 1)$ evaluated at x.

$$\mu^c_{ab} = \sigma\left[\mathcal{N}\left(\frac{a-\mu}{\sigma}\right) - \mathcal{N}\left(\frac{a-\mu}{\sigma}\right)\right] + Z\mu + a\Phi\left(\frac{a-\mu}{\sigma}\right) + b\left(1 - \Phi\left(\frac{b-\mu}{\sigma}\right)\right)$$

$$\sigma^{c2}_{ab} = Z[\sigma^{t2}_{ab} + \mu^{t2}_{ab} - 2\mu^t_{ab}\mu^c_{ab} + \mu^{c2}_{ab}] +$$
$$(a - \mu^c_{ab})^2 \Phi\left(\left(\frac{a-\mu}{\sigma}\right)\right) + (b - \mu^c_{ab})^2 \left(1 - \Phi\left(\left(\frac{b-\mu}{\sigma}\right)\right)\right)$$

where $$\sigma^{t2}_{ab} = \sigma^2\left[1 + \frac{\left(\frac{a-\mu}{\sigma}\right)\mathcal{N}\left(\frac{a-\mu}{\sigma}\right) - \left(\frac{b-\mu}{\sigma}\right)\mathcal{N}\left(\frac{b-\mu}{\sigma}\right)}{Z} - \left(\frac{\mathcal{N}\left(\frac{a-\mu}{\sigma}\right) - \mathcal{N}\left(\frac{b-\mu}{\sigma}\right)}{Z}\right)^2\right]$$

This derivation shows that the expectation value $E[x_c]$ for channel c in x can be computed by replacing μ and σ with $\beta_c$ and $\gamma_c$ respectively.

If the preceding layer's output is the result of a residual connection, then $E[x_{out}] = E[x_{in}] + E[x_{last}]$, where $x_{out}$ is the output of the residual block, $x_{in}$ is the input to the residual block, and $x_{last}$ is the output of the last layer in the residual block. $E[x_{in}]$ may be computed recursively from the preceding residual blocks, where the input to the network is assumed to be centered and scaled to have unit variance. $Var[x_{out}]$ may be computed in a similar manner.

Each of the embodiment methods described above may be implemented in approximated neural network models configured for execution on resource limited computing devices by subtracting the determined expected error for each layer of the model from the layer's bias parameter. This implementation works because the expected error vector will have the same shape as the layer's output. By performing analytical bias correction operations and implementing the result in each layer's bias parameter, a computing device converting a neural network model into a approximated neural network may forgo expensive fine tuning or training operations that would otherwise be required to reduce or account for bias errors, which makes the neural network better suited for deployment on client devices, software development kits (SDKs), cloud computing networks, and any system in which the owner/user of the model and the owner/user of the inference hardware are different.

FIG. 1 illustrates approximation operations 100 that may occur in a computing device using quantization as an example of an approximation technique. Similar modules may be used for other approximation techniques. The example illustrated in FIG. 1 involves quantizing a neural network model trained using 32-bit floating-point values ("float32") values on a 32 bit-width processor and executing that model on a computing device having an architecture configured to process 8-bit unsigned (uint8) values. Quantization operations include offline quantization 102 of the neural network weights in float32 format to uint8 format values to generate the approximation neural network. In the illustrated example, an 8 bit-width quantized model is directly generated from a float32 pre-trained model, and all weights are firstly quantized offline. Then during inference, 32-bit float inputs are quantized to uint8 values that are passed to the approximation neural network operating code ("OP uint8") 104. The approximation neural network operating code 104 may perform various fixed-point runtime operations, such as running published weights tensor flow application programming interfaces (APIs) QuantizedConv2d, QuantizedAdd, and QuantizedMul, etc. These operations produce a 32-bit accumulated result value (int32), which is converted down to a uint8 output value through activation re-quantization in the re-quantization component 108. This output will be the input to the next operation.

FIG. 1 illustrates that there are five types of loss in the fixed-point quantized pipeline, e.g., input quantization loss, weight quantization loss, runtime saturation loss, activation re-quantization loss, and possible clipping loss for certain non-linear operations, such as ReLU6. For these and other reasons, the quantization of large bit-width values into small bit-width representations may introduce quantization noise or bias on the approximated weights and activations. Other approximation techniques may exhibit similar sources of noise and bias in approximated weights and activations. That is, there may be a significant numerical difference between the parameters in a trained neural network model (e.g., float32, int32, etc.) and their approximations (e.g., uint8 output value, etc.) from compression or quantization. This difference may have a significant negative impact on the efficiency, performance or functioning of the neural network or the computing device.

Figure 2:
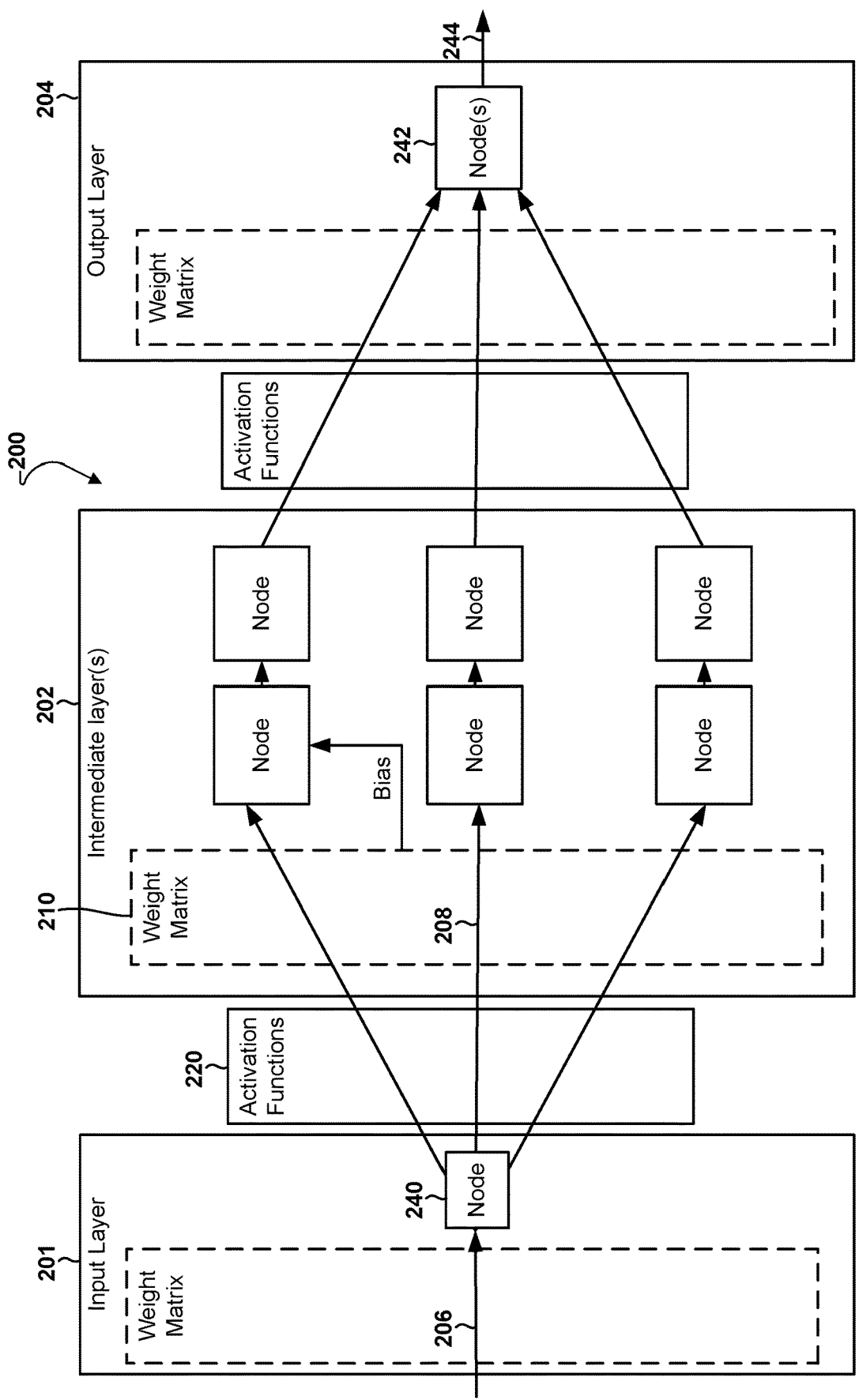
FIG. 2 is a component block diagram illustrating interactions between components in an example neural network suitable for use with various embodiments.

FIG. 2 illustrates interactions between components in an example neural network suitable for use with various embodiments. The multilayer neural network 200 may include an input layer 201, one or more intermediate layer(s) 202, and an output layer 204. Each of the layers may include one or more nodes 240 that perform operations on the data. In between the layers, there may be various activation functions 220, such as a rectified linear unit (ReLU) that cuts off activations below zero.

The input layer 201 may receive and process an input signal 206, generate an activation 208, and pass it to the intermediate layer(s) 202 as black-box inputs. The intermediate layer(s) inputs may multiply the incoming activation with a weight matrix 210 or may apply one or more weight factors and/or a bias to the black-box inputs.

The nodes in the intermediate layer(s) 202 may execute various functions on the inputs augmented with the weight factors and the bias. Intermediate signals may be passed to other nodes or layers within the intermediate layer(s) 202 to produce the intermediate layer(s) activations that are ultimately passed as inputs to the output layer 204. The output layer 204 may include a weighting matrix that further augments each of the received signals with one or more weight factors and bias. The output layer 204 may include a node 242 that operates on the inputs augmented with the weight factors to produce an estimated value 244 as output or neural network inference.

Various embodiments provide efficient algorithms that may be implemented in circuitry, in software, and in combinations of circuitry and software for performing analytical bias correction operations for improved approximation without requiring a complete understanding or rigorous mathematical models. The embodiment algorithms are premised upon a general mathematical model of the linear and non-linear interferences, details of which described below. These equations are not necessarily directly solvable, and provide a model for structuring that perform analytical bias correction operations for improved performance of approximated neural networks according to various embodiments.

Figure 3:
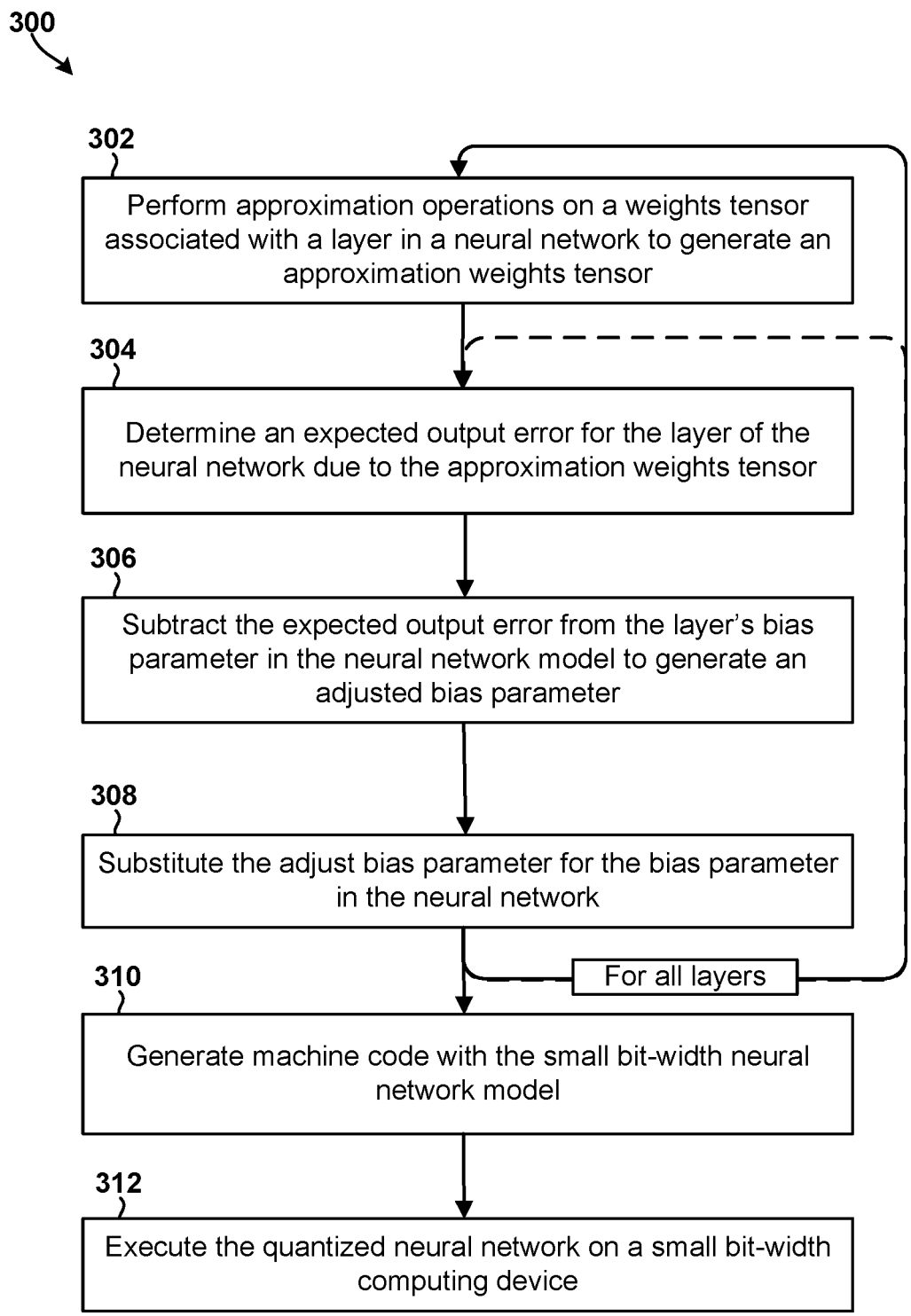
FIG. 3 is a component block diagram illustrating a computing device configured to perform analytical bias correction operations for improved performance of approximated neural network models in accordance with the various embodiments.

FIG. 3 illustrates an analytical bias correction method 300 that may be performed via a processor in a computing device to eliminate or reduce approximation errors in an approximated neural network model according to various embodiments.

In block 302, the processor may perform approximation (e.g., compression or quantization) operations on a weights tensor W associated with a layer in a neural network (e.g., 200) to generate an approximation weights tensor $\tilde{W}$ associated with an original weights tensor W. For example, the processor may convert 32 bit-width weights of a layer of a neural network model trained on a computing device having a 32 bit-width architecture into 8-bit integer weights to enable the neural network to execute on an 8 bit-width processor. As 8 bit-width values have less precision than 32 bit-width values, a compressed or quantized weights tensor is an approximation of the original weights tensor.

In block 304, the processor may determine an expected output error c for the layer of the neural network due to the approximation operations performed on the original weights tensor. For example, the processor may determine the weights tensor error $\varepsilon$ for a layer of the neural network based on a difference between the approximation weights tensor $\tilde{W}$ and the original weights tensor W (e.g., $\varepsilon=\tilde{W}-W$). The processor may also determine or receive an expected input for the neural network layer, which may be performed independently or in parallel with the operations in blocks 302 and 304. The processor may apply the expected input to the weights tensor error $\varepsilon$ to generate the expected error for the approximation weights tensor.

In block 306, the processor may subtract the expected output error from the layer's bias parameter in the neural network model to generate an adjusted bias parameter. The bias parameter in a neural network layer may be applied to an output (or pre-activation) of the layer prior to the activation function to introduce or remove a bias. Adjusting the bias parameter thus enables removal of bias introduced from approximation of weights and activations in the neural network. In a layer without a bias parameter, the bias parameter may be presumed to be 0, in which case the expected output error may be subtracted from 0 to yield the adjusted bias factor for the layer.

In block 308, the processor may substitute the adjusted bias parameter for the bias parameter in the neural network. Implementing the adjusted bias parameter in the layer corrects an output (or pre-activation) so that the activation function in the neural network layer generates bias corrected outputs, which in turn become the inputs (or activations) for the next layer in the neural network. This substitution of the adjusted bias parameter ensures that the expected output of the neural network layer with approximation (i.e., approximated small bit-width) weights is the same or nearly the same as the expected output of the neural network layer with the original (i.e., large bit-width) weights.

In some embodiments, a mathematically equivalent method may be used in blocks 304 and 306 using expected pre-activation outputs of an original model and a model to which an approximation has been applied. In such embodiments, the computing device may compute expected pre-activation outputs E[y] produced by the original weights W and pre-activation outputs E[$\tilde{y}$] produced by the approximated weights $\tilde{W}$, using batches of data. The same data should be use for computing both E[y] and E[$\tilde{y}$]. Then, the computing device may compute a correction factor for the layer bias parameter based on the difference, such as z=E

[ỹ]−E[y], with the correction factor appropriately adapted for convolutional or fully connected layers. Mathematically the results are equivalent because:

$$\mathbb{E}_{[\tilde{y}]} - \mathbb{E}_{[y]} = (W+\epsilon) * \mathbb{E}_{[x]} - W * \mathbb{E}_{[x]} = \epsilon * \mathbb{E}_{[x]} = z.$$

The operations of blocks 302-308 may be repeated for all layers in the neural network to generate an approximated neural network suitable for execution on a resource limited processor. In some embodiments, the operations in block 302 may be performed for all layers to generate an approximation of the neural network model such that all approximate weights tensors are generated in one operation, in which case the operations of 304-308 may be performed repeatedly working with each of the approximated layers generated in block 302 as indicated by the dashed line. In a further embodiment, the operations of 302-306 may be performed for all layers of the neural network, outputting approximate weights tensors and a file of adjusted bias parameters, and the operations in block 308 may be performed to substitute the adjusted bias parameters in each layer of the neural network, such as part of operations performed during or as part of compiling the neural network to generate machine code in block 310. The operations in the method 300 also may be performed in other orders and sequences.

In block 310, the processor may generate machine code with the small bit-width neural network model to yield code that can execute on a resource limited processor. The operations in block 310 may be performed by the computing device implementing a variety of compilers or other algorithms configured to convert a neural network into processor executable instructions for a small bit-width processor.

In some embodiments, the operations of blocks 302-310, and particularly the approximation operations may be performed at compile time when executable code for an approximation of the neural network is generated from a trained neural network. The operations involved in such batch normalization may involve a compiler and/or a software development kit (SDK) executing on a computing device (e.g., a CLE device that trained the large bit-width neural network) performing batch normalization folding on the trained neural network, followed by cross-layer equalization, and approximating the neural network layer weights to the desired approximation neural network for execution on a resource limited computing device.

In block 312 the approximation of the neural network model may be executed on a resource limited computing device by the computing device executing the machine code generated in block 310. For example, the approximation of the neural network model may be executed on an Internet of things (IoT) device, a mobile device (e.g., a smart phone), etc.

Figure 4:
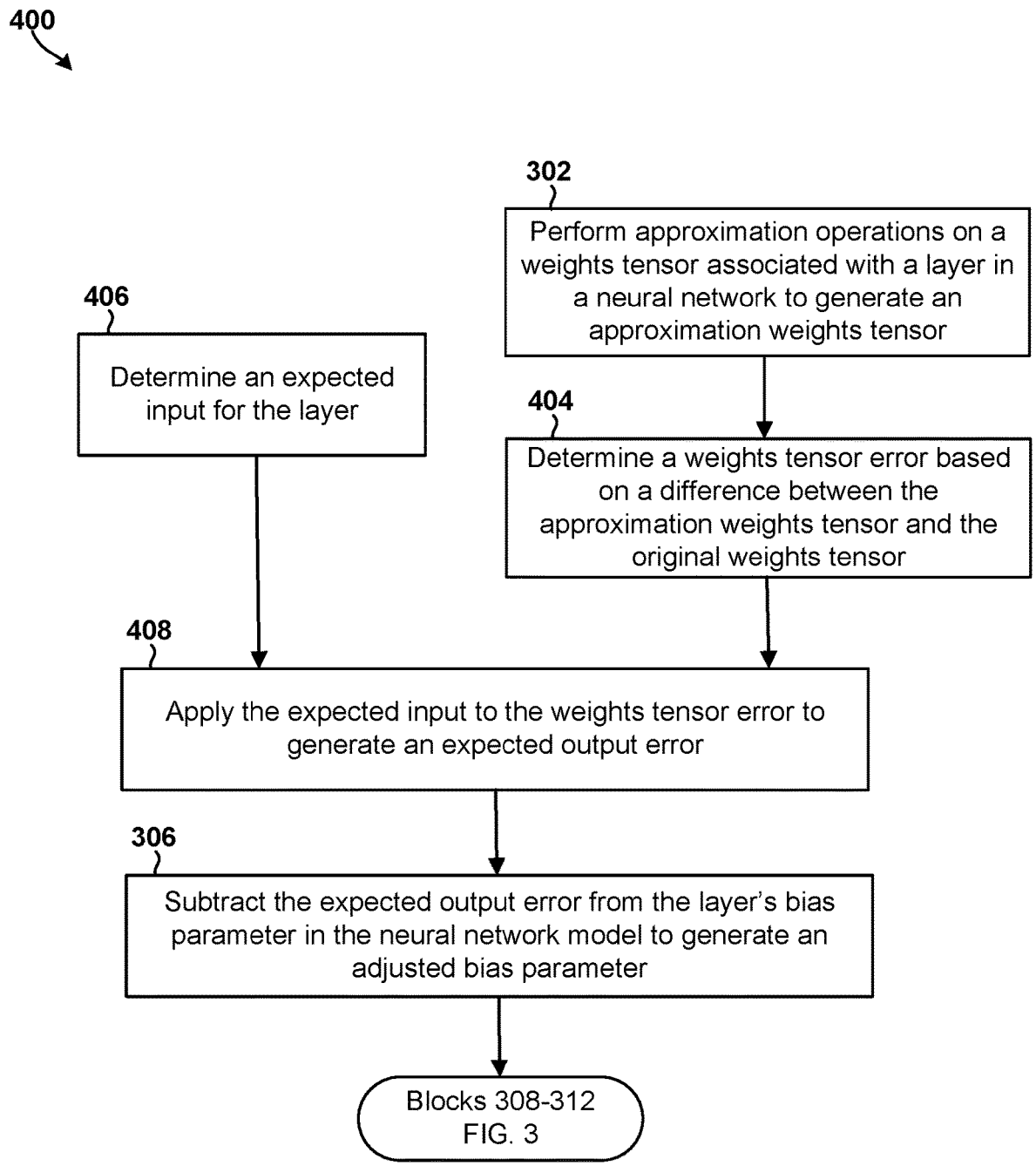
FIGS. 4, 5 and 6 are process flow diagrams illustrating methods of performing analytical bias correction operations for approximated neural network models in accordance with various embodiments.

FIG. 4 illustrates a method 400 of operations that may be performed in a further embodiment for correcting bias introduced into a neural network due to approximation of the neural network in accordance with another embodiment. The method 400 may be performed by a processor in a computing device.

In block 302, the processor may perform approximation (e.g., compression, quantization, etc.) operations on a weights tensor associated with a layer in a neural network as described for the same numbered block of the method 300.

In block 404, the processor may determine a weights tensor error based on a difference between the approximated weights tensor and the original weights tensor. For example, the processor may determine the weights tensor error ε for the layer based on a difference between the approximated weights tensor $\tilde{W}$ and the original weights tensor W (e.g., ε=$\tilde{W}$−W).

In block 406, the processor may determine an expected input (e.g., E[x]) for the layer. For example, the processor may determine the expected input based on the preceding layer's learnable batch normalization parameters (e.g., batch normalization shift parameter β, etc.). The operations in block 406 may be performed in parallel with operations in blocks 302 and 404.

In block 408, the processor may determine an expected output error (e.g., E[ε*x]) for the layer based on the expected input [e.g., E[x]) to the layer and the approximation weights tensor error ε associated with the layer. For example, the processor may apply the expected input to the weights tensor error to determine the expected output error.

In block 306, the processor may subtract the expected output error from the layer's bias parameter in the neural network model to generate an adjusted bias parameter as described for the like numbered block of the method 300 with reference to FIG. 3.

The processor may then perform the operations in blocks 308-312 of the method 300 as described with reference to FIG. 3.

Figure 5:
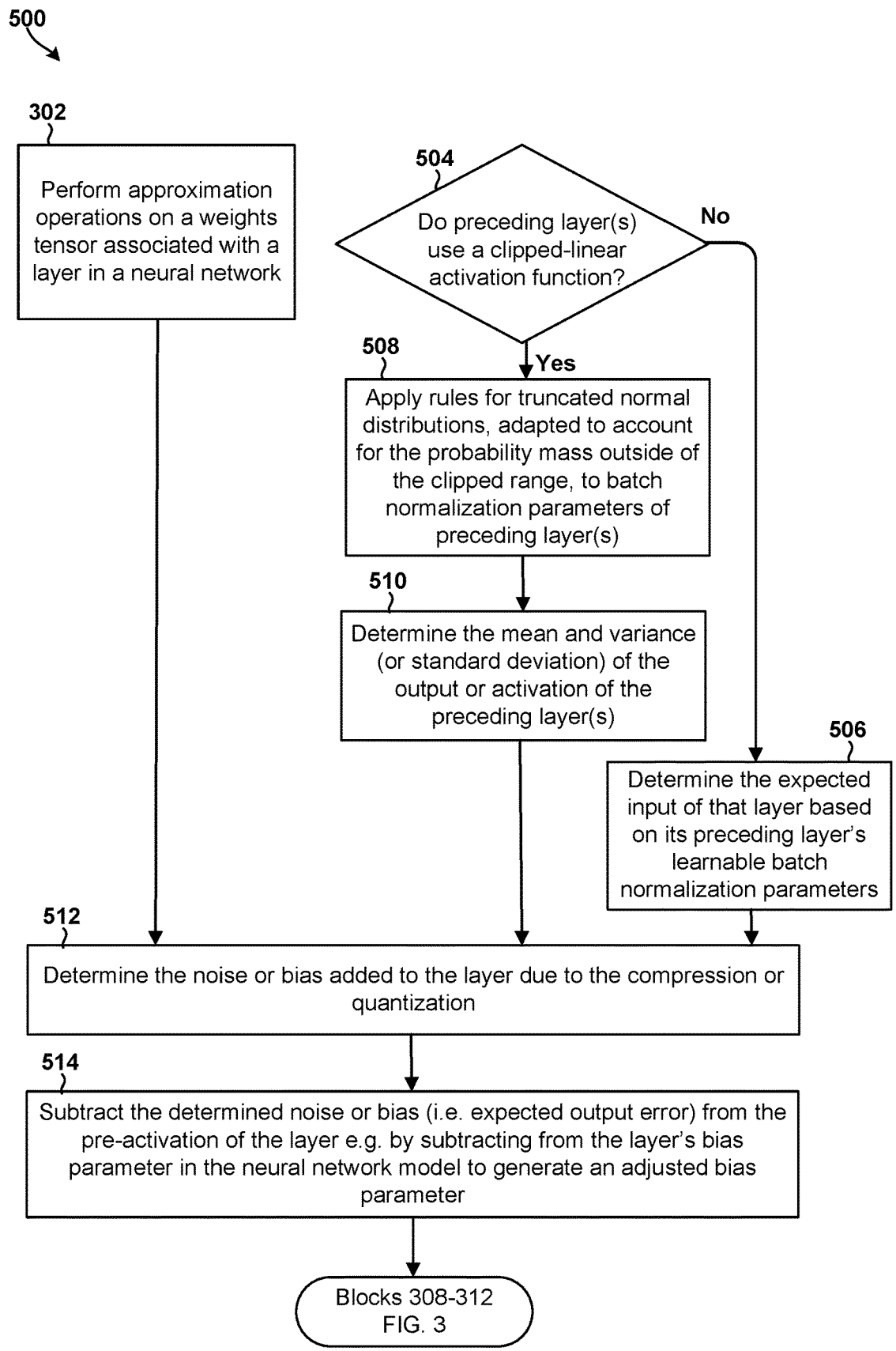

FIG. 5 illustrates a method 500 of operations that may be performed in a further embodiment for correcting bias introduced into a neural network due to approximation of the neural network in accordance with another embodiment. The method 500 may be performed by a processor in a computing device configure to transform a trained neural network model into an approximation neural network model for execution on a resource limited processor.

In the example illustrated in FIG. 5, in block 504 through 510, the processor performs various operations to determine the expected input to the layer to which approximation operations (e.g., quantization, compression, etc.) are applied, similar to the operations in block 406 of the method 400 as described. The operations in blocks 504 through 510 may be performed concurrent with or in parallel with the operations in block 302 of the method 300 as described with reference to FIG. 3.

With reference to FIGS. 1-5, in determination block 504, a processor may determine whether a layer in a neural network includes a clipped-linear activation function. In response to determining that the layer does not use a clipped-linear activation function (i.e., determination block 504="No"), the processor may determine the expected input of that layer based on its preceding layer's learnable batch normalization parameters in block 506.

In response to determining that the layer includes a clipped-linear activation function (i.e., determination block 504="Yes"), the processor may apply rules for truncated normal distributions, adapted to account for the probability mass outside of the clipped range, in block 508.

In block 510, the processor may determine the mean and variance (or standard deviation) of the layer's output/activation. Due to the centralization and normalization applied by batch normalization, the mean and standard deviation of the pre-activations may be the batch normalization scale γ and shift β parameters. In some embodiments, the rules for computing the mean and variance of the truncated normal distribution may be adopted by accounting for the probability mass for x<a and x>b.

In blocks 512 and 514, the processor may counteract the effects of noise or bias added to the neural network layer due to approximation by calculating the bias (i.e., expected output error) and compensating for it by subtracting the calculated bias from the pre-activation of the layer. For example, the processor may apply the expected input determined in block 506 to a weights tensor error to generate an expected error (e.g., in block 408 illustrated in FIG. 4), and subtract the expected error from the activation of the layer in block 514, such as similar to the operations in block 306 of the method 300 as described with reference to FIGS. 3 and 4.

The processor may then perform the operations in blocks 308-312 of the method 300 as described with reference to FIG. 3.

In a further embodiment, processing of model data need not be performed if the provider of the neural network model provides statistical information characterizing the model, including mean and various values of various layer outputs and activations. If expected mean and output values are given by the model provider, then the given expected mean may be used directly, as is illustrated and described with reference to FIG. 6.

Figure 6:
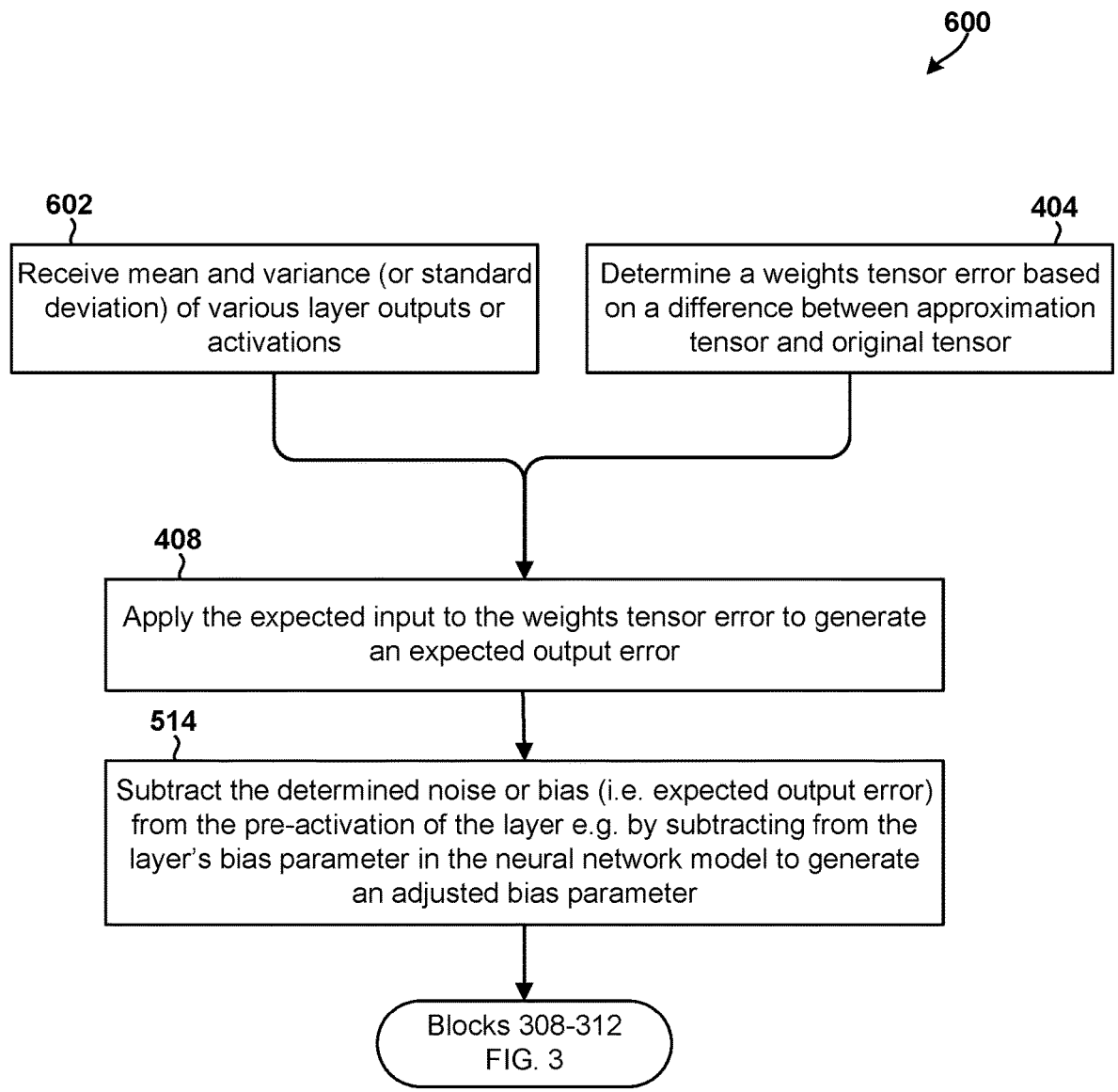

FIG. 6 illustrates a method 600 of operations that may be performed in a further embodiment for correcting bias introduced into a neural network due to approximation of the neural network in accordance with another embodiment. With reference to FIGS. 1-6, the method 600 may be performed by a processor in a computing device configured to convert a trained neural network model into an approximation neural network suitable for execution on a resource limited processor.

In block 602, a processor may receive mean and variance and/or standard deviation values of a neural network model (or other data set) to be approximated or of various layer outputs or activations. In block 404, the processor may determine a weights tensor error based on a difference between the approximated weights tensor and the original weights tensor. In block 408, the processor may apply the expected input to the weights tensor error to generate an expected output error. In block 514, the processor may subtract the determined noise or bias from the pre-activation of the layer, such as by subtracting from the layer's bias parameter in the neural network model to generate an adjusted bias parameter as described for the like numbered block of the method 500 with reference to FIG. 5.

Thus, in the method 600, the processor may use the received mean and variance and/or standard deviation values of a neural network model (or other data set) to estimate the bias factors and compensate for bias by adding the calculated bias back to the output/activation of the layer to counteract the effects of noise or bias added to the neural network layer due to approximation operations, such as compression or quantization.

The processor may apply the expected input determined in block 408 to a weights tensor error to generate an expected error as described for the like numbered block of the method 400 with reference to FIG. 4.

In block 514, the processor may subtract the determined noise or bias (i.e. expected output error) from the pre-activation of the layer such as by subtracting from the layer's bias parameter in the neural network model to generate an adjusted bias parameter as described for the like numbered block of the method 500 with reference to FIG. 5.

In a further embodiment, if the mean and variance of each layer's output are not provided, the processor may be configured to determine the noise or bias added to the layer due to the approximation operations (e.g., compression or quantization) and/or to determine expectant inputs or outputs, by feeding data through the network. These operations differ from the situation in which per-layer means and variances are provided.

The processor may then perform the operations in blocks 308-312 of the method 300 as described with reference to FIG. 3.

Figure 7:
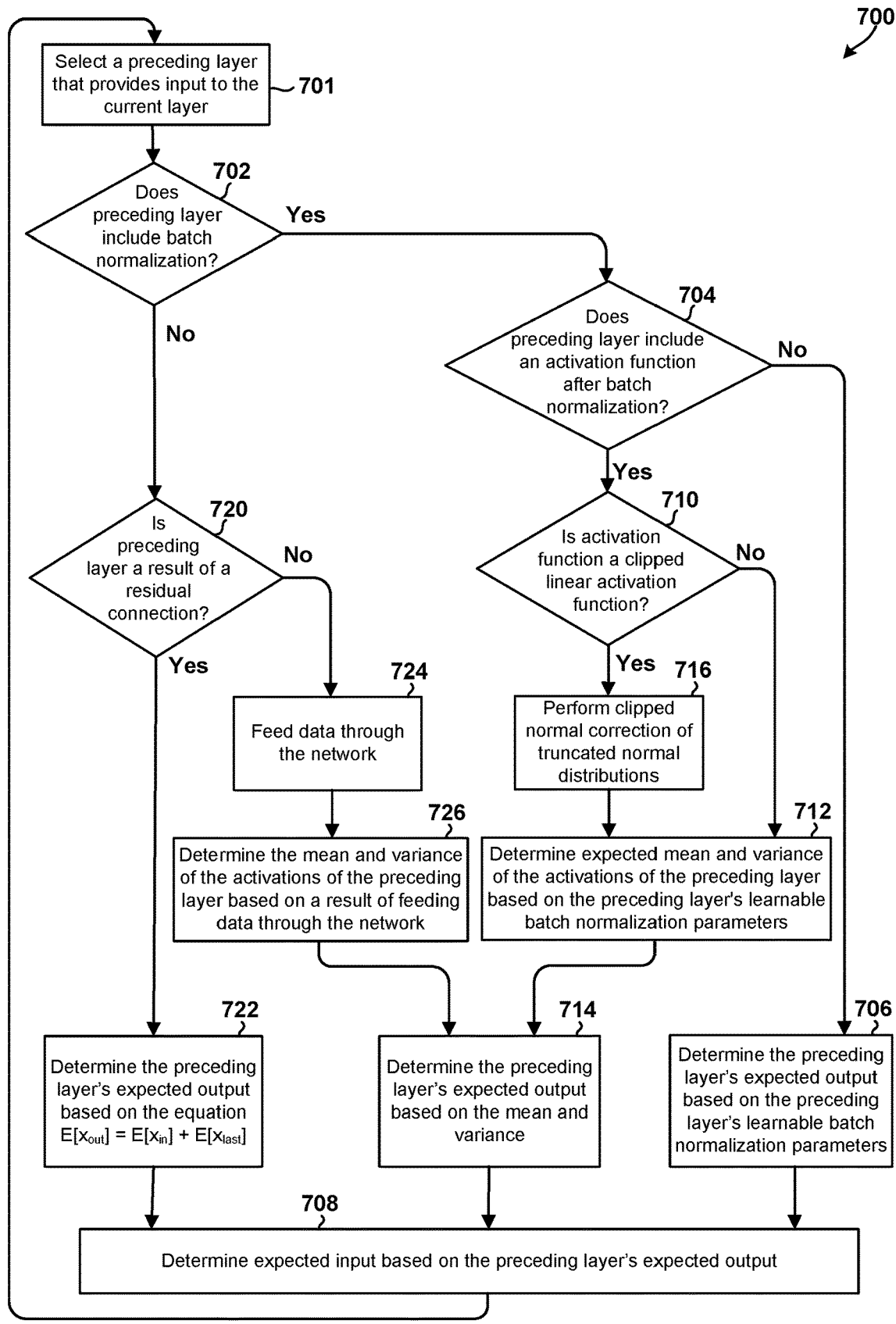
FIG. 7 is process flow diagrams illustrating a method of determining an expected input for a layer in a neural network in accordance with an embodiment.

FIG. 7 illustrates a method 700 for determining the expected input of a current layer in the neural network that may be performed as part of the operations in block 406 of the method 400 in accordance with an embodiment. With reference to FIGS. 1-7, the method 700 may be performed by a processor in a computing device configure to transform a trained neural network model into an approximation neural network model for execution on a resource limited processor.

In block 701, the processor may select a preceding layer that provides input to the current layer in the neural network. The selected preceding layer may be the only layer that provides input to the current layer or one of a plurality of preceding layers that provide inputs to the current layer.

In determination block 702, the processor may determine whether the preceding layer includes batch normalization.

In response to determining that the preceding layer includes batch normalization (i.e., determination block 702="Yes"), the processor may determine whether the preceding layer includes an activation function after the batch normalization in determination block 704.

In response to determining that the preceding layer does not include an activation function after the batch normalization (i.e., determination block 704="No"), the processor may determine the expected output/activation of the preceding layer (and the expected input of the current layer) based on the preceding layer's learning batch normalization parameters in block 706. For example, the processor may determine or set the expected input of the current layer based on one or more of the preceding layer's learning batch normalization parameters, such as the preceding layer's batch normalization shift parameter. In block 708, the processor may determine an expected input for the current layer in the neural network based on the expected output of the preceding layer.

In response to determining that the preceding layer includes an activation function after the batch normalization (i.e., determination block 704="Yes"), the processor may determine whether the activation function after batch normalization is a clipped-linear activation function in determination block 710.

In response to determining that the activation function after batch normalization is not a clipped-linear activation function (i.e., determination block 710="No"), the processor may determine expected mean and variance values based on the preceding layer's learnable batch normalization parameters in block 712. In block 714, the processor may determine the preceding layer's expected output based on the mean and variance, and in block 708 determine an expected input for the current layer in the neural network based on the expected output of the preceding layer.

In response to determining that the activation function after batch normalization is a clipped-linear activation function (i.e., determination block 710="Yes"), in blocks 716, 712, 714 and 708, the processor may use clipped normal computations using appropriate a and b values (e.g. a=0, b=infinity for ReLU activation) and the preceding layer's batch normalization scale and shift parameters as original mean and standard deviation (stdev) respectively to determine the preceding layer expected output.

Said another way, in block 716, the processor may perform clipped normal correction of truncated normal distributions by applying rules for truncated normal distributions adapted to account for the probability mass outside of the clipped range. In block 712, the processor may determine expected mean and variance values based on the preceding layer's learnable batch normalization parameters. In block 714, the processor may determine the preceding layer's expected output based on the mean, variance or standard deviation. In block 708, the processor may determine an expected input for the current layer based on the expected output of the preceding layer.

For example, the processor may use clipped normal computations using appropriate a and b values (e.g., a=0, b=infinity for ReLU activation) and the preceding layer's batch normalization scale and shift parameters as original mean and standard deviation (stdev) values, respectively, to determine the preceding layer expected output.

In response to determining that the preceding layer does not include batch normalization (i.e., determination block 702="No"), the processor may determine whether the preceding layer is a result of a residual connection in block 720.

In response to determining that the preceding layer is a result of a residual connection (i.e., determination block 720="Yes"), the computing device may determine the preceding layer's expected output/activation based on the equation $E[x_{out}]=E[x_{in}]+E[x_{last}]$ in block 722, in which $x_{out}$ is the output of the residual block, $x_{in}$ is the input to the residual block, and $x_{last}$ is the output of the last layer in the residual block.

In response to determining that the preceding layer is not a result of a residual connection (i.e., determination block 720="No"), the computing device may perform various operations to feed data through the network in block 724. In some embodiments the computing device may compute an expected input (e.g., E[x]) using batches of data to compute an expected bias as described herein. In some embodiments, the computing device may compute expected pre-activation outputs of the floating-point model (e.g., E[y]) and approximated model (e.g., $E[\tilde{y}]$) using batches of data, and then compute a correction factor based on the difference (e.g., $z=E[\tilde{y}]-E[y]$) appropriately adapted for convolutional or fully connected layers.

In block 726, the processor may determine the mean and variance of the activations of the preceding layer based on a result of feeding data through the network. In block 714, the processor may determine the preceding layer's expected output based on the mean and variance, and in block 708, determine an expected input for the current layer in the neural network based on the expected output of the preceding layer.

The operations in blocks 701-726 of the method 700 may be performed repeatedly and applied to each input to the layer (or to the output of each of its immediately preceding layers) as they can all have different characteristics. For example, each input or preceding layer may include batch normalization, may include an activation function, may be a result of a residual connection, etc.

Figure 8:
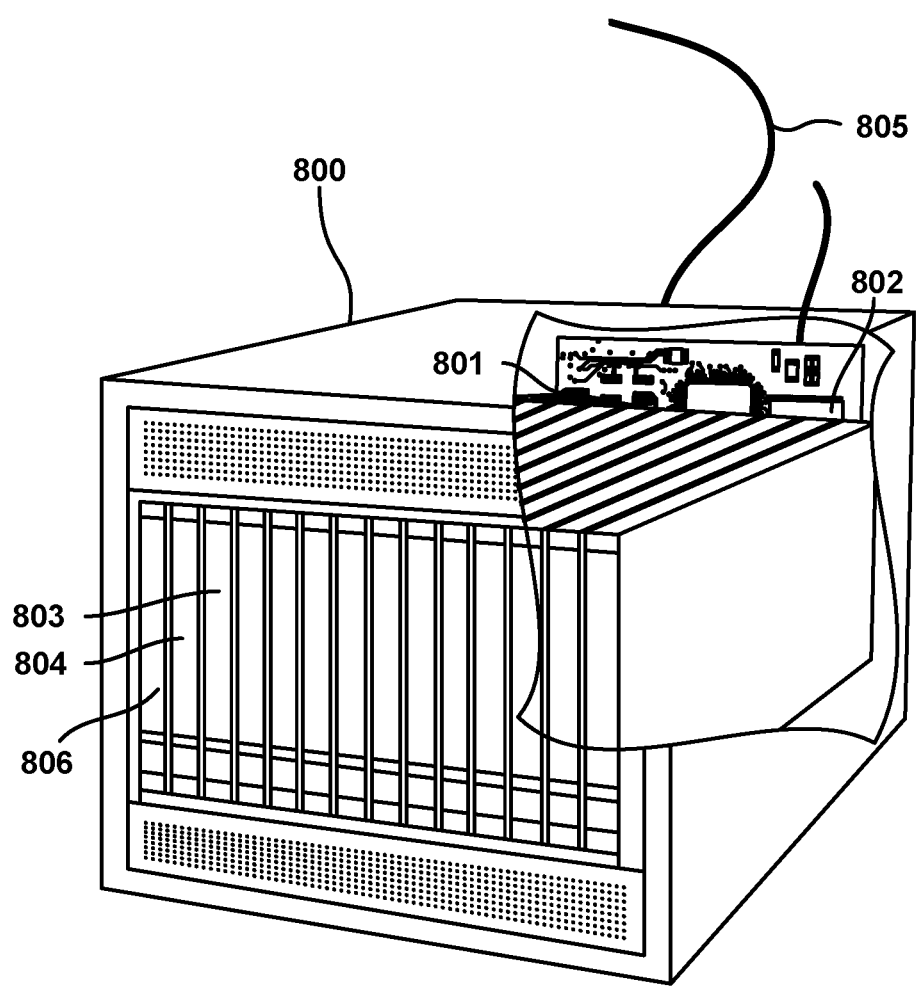
FIG. 8 is a component block diagram of server suitable for use with the various embodiments.

Various embodiments may be implemented on any of a variety of commercially available computing devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 805, such as a local area network coupled to other operator network computers and servers.

The processors may be any programmable microprocessor, microcomputer or multiple processor chip or chips that can be configured by software instructions (applications) to perform a variety of functions, including the functions of the various embodiments described in this application. In some wireless devices, multiple processors may be provided, such as one processor dedicated to wireless communication functions and one processor dedicated to running other applications. Typically, software applications may be stored in the internal memory 803 before they are accessed and loaded into the processor. The processor may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments may be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for generating an approximation of a neural network, comprising:
    performing approximation operations on a weights tensor associated with a layer of a neural network to generate an approximation weights tensor;
    determining an expected output error of the layer in the neural network due to the approximation weights tensor;
    subtracting the expected output error from a bias parameter of the layer to determine an adjusted bias parameter;
    substituting the adjusted bias parameter for the bias parameter in the layer;
    repeating operations of performing approximation operations on the weights tensor associated with a layer of the neural network, determining an expected output error of the layer of the neural network, subtracting the expected output error from a bias parameter of the layer to determine an adjusted bias parameter, and substituting the adjusted bias parameter for the bias parameter in the layer for one or more layers in the neural network to generate the approximation neural network; and
    outputting an approximation neural network suitable for execution on a resource limited processor.

2. The method of claim 1, wherein determining an expected output error of the layer in the neural network due to the approximation weights tensor comprises determining an approximation weights tensor error based on a difference between an original weights tensor and the approximation weights tensor.

3. The method of claim 1, wherein determining an expected output error of the layer in the neural network comprises:
    for each preceding layer that provides input to the layer:
        determining whether the preceding layer includes an activation function after batch normalization; and
        determining an expected input of the layer based on learnable batch normalization parameters of the preceding layer in response to determining that the preceding layer does not include an activation function after batch normalization.

4. The method of claim 3, wherein the learnable batch normalization parameters include a batch normalization shift parameter.

5. The method of claim 1, wherein determining an expected output error of the layer in the neural network comprises:
    for each preceding layer that provides input to the layer:
        determining whether the preceding layer includes an activation function after batch normalization;
        determining whether the activation function is a clipped linear activation function in response to determining that the preceding layer includes an activation function after batch normalization; and
        applying rules for truncated normal distributions adapted to account for a probability mass outside of a clipped range in response to determining that the activation function is a clipped linear activation function.

6. The method of claim 5, wherein determining an expected output error of the layer in the neural network comprises:
    for each preceding layer that provides input to the layer:
        determining an expected mean, variance or standard deviation of activation of the preceding layer based on learnable batch normalization parameters of the preceding layer; and
        determining an expected input of the layer based on the determined expected mean, variance or standard deviation.

7. The method of claim 1, wherein determining an expected output error of the layer in the neural network comprises:
    for each preceding layer that provides input to the layer:
        determining whether the preceding layer includes batch normalization;
        determining whether the preceding layer is a result of a residual connection in response to determining that the preceding layer does not include batch normalization; and
        determining the preceding layer's expected output based on the equation $E[x_{out}]=E[x_{in}]+E[x_{last}]$ for each preceding layer that provides input to the layer in response to determining that the preceding layer is the result of a residual connection.

8. The method of claim 7, wherein determining an expected output error of the layer in the neural network comprises:
  determining for each preceding layer that provides input to the layer a mean, variance or standard deviation of activations of the preceding layer based on a result of feeding data through the neural network in response to determining that the preceding layer is not the result of a residual connection.

9. A method of transforming a trained neural network model into an approximation neural network suitable of execution on a resource limited processor, comprising:
  performing approximation operations on a weights tensor associated with a layer of a neural network to generate an approximation weights tensor;
  determining an expected output error of the layer in the neural network due to the approximation weights tensor;
  subtracting the expected output error from a bias parameter of the layer to determine an adjusted bias parameter;
  substituting the adjusted bias parameter for the bias parameter in the layer;
  repeating operations of performing approximation operations on the weights tensor associated with a layer of the neural network, determining an expected output error of the layer of the neural network, subtracting the expected output error from a bias parameter of the layer to determine an adjusted bias parameter, and substituting the adjusted bias parameter for the bias parameter in the layer for one or more layers in the neural network to generate the approximation neural network; and
  loading the approximation neural network on a resource limited processor.

10. The method of claim 9, wherein determining an expected output error of the layer in the neural network due to the approximation weights tensor comprises determining an approximation weights tensor error based on a difference between an original weights tensor and the approximation weights tensor.

11. The method of claim 9, wherein determining an expected output error of the layer in the neural network comprises:
  for each preceding layer that provides input to the layer:
    determining whether the preceding layer includes an activation function after batch normalization; and
    determining an expected input of the layer based on learnable batch normalization parameters of the preceding layer in response to determining that the preceding layer does not include an activation function after batch normalization.

12. The method of claim 11, wherein the learnable batch normalization parameters include a batch normalization shift parameter.

13. The method of claim 9, wherein determining an expected output error of the layer in the neural network comprises:
  for each preceding layer that provides input to the layer:
    determining whether the preceding layer includes an activation function after batch normalization;
    determining whether the activation function is a clipped linear activation function in response to determining that the preceding layer includes an activation function after batch normalization; and
    applying rules for truncated normal distributions adapted to account for a probability mass outside of a clipped range in response to determining that the activation function is a clipped linear activation function.

14. The method of claim 13, wherein determining an expected output error of the layer in the neural network comprises:
  for each preceding layer that provides input to the layer:
    determining an expected mean, variance or standard deviation of activation of the preceding layer based on learnable batch normalization parameters of the preceding layer; and
    determining an expected input of the layer based on the determined expected mean, variance or standard deviation.

15. The method of claim 9, wherein determining an expected output error of the layer in the neural network comprises:
  for each preceding layer that provides input to the layer:
    determining whether the preceding layer includes batch normalization; and
    determining whether the preceding layer is a result of a residual connection in response to determining that the preceding layer does not include batch normalization; and
    determining the preceding layer's expected output based on the equation $E[x_{out}]=E[x_{in}]+E[x_{last}]$ for each preceding layer that provides input to the layer in response to determining that the preceding layer is the result of a residual connection.

16. The method of claim 15, wherein determining an expected output error of the layer in the neural network comprises:
  determining for each preceding layer that provides input to the layer a mean, variance or standard deviation of activations of the preceding layer based on a result of feeding data through the neural network in response to determining that the preceding layer is not the result of a residual connection.

17. A computing device, comprising:
  a processor configured with processor-executable instructions to perform operations comprising:
    performing approximation operations on a weights tensor associated with a layer of a neural network to generate an approximation weights tensor;
    determining an expected output error of the layer in the neural network due to the approximation weights tensor;
    subtracting the expected output error from a bias parameter of the layer to determine an adjusted bias parameter;
    substituting the adjusted bias parameter for the bias parameter in the layer;
    repeating operations of performing approximation operations on the weights tensor associated with a layer of the neural network, determining an expected output error of the layer of the neural network, subtracting the expected output error from a bias parameter of the layer to determine an adjusted bias parameter, and substituting the adjusted bias parameter for the bias parameter in the layer for one or more layers in the neural network to generate the approximation neural network; and
    outputting an approximation neural network suitable for execution on a resource limited processor.

18. The computing device of claim 17, wherein the processor is further configured with processor-executable instructions to perform operations such that determining an expected output error of the layer in the neural network due to the approximation weights tensor comprises determining an approximation weights tensor error based on a difference between an original weights tensor and the approximation weights tensor.

19. The computing device of claim 17, wherein the processor is further configured with processor-executable instructions to perform operations such that determining an expected output error of the layer in the neural network comprises:
for each preceding layer that provides input to the layer:
determining whether the preceding layer includes an activation function after batch normalization; and
determining an expected input of the layer based on learnable batch normalization parameters of the preceding layer in response to determining that the preceding layer does not include an activation function after batch normalization.

20. The computing device of claim 19, wherein the processor is further configured with processor-executable instructions to perform operations such that the learnable batch normalization parameters include a batch normalization shift parameter.

21. The computing device of claim 17, wherein the processor is further configured with processor-executable instructions to perform operations such that determining an expected output error of the layer in the neural network comprises:
for each preceding layer that provides input to the layer:
determining whether the preceding layer includes an activation function after batch normalization;
determining whether the activation function is a clipped linear activation function in response to determining that the preceding layer includes an activation function after batch normalization; and
applying rules for truncated normal distributions adapted to account for a probability mass outside of a clipped range in response to determining that the activation function is a clipped linear activation function.

22. The computing device of claim 21, wherein the processor is further configured with processor-executable instructions to perform operations such that determining an expected output error of the layer in the neural network comprises:
for each preceding layer that provides input to the layer:
determining an expected mean, variance or standard deviation of activation of the preceding layer based on learnable batch normalization parameters of the preceding layer; and
determining an expected input of the layer based on the determined expected mean, variance or standard deviation.

23. The computing device of claim 17, wherein the processor is further configured with processor-executable instructions to perform operations such that determining an expected output error of the layer in the neural network comprises:
for each preceding layer that provides input to the layer:
determining whether the preceding layer includes batch normalization; and
determining whether the preceding layer is a result of a residual connection in response to determining that the preceding layer does not include batch normalization; and
determining the preceding layer's expected output based on the equation $E[x_{out}]=E[x_{in}]+E[x_{last}]$ for each preceding layer that provides input to the layer in response to determining that the preceding layer is the result of a residual connection.

24. The computing device of claim 23, wherein the processor is further configured with processor-executable instructions to perform operations such that determining an expected output error of the layer in the neural network comprises:
determining for each preceding layer that provides input to the layer a mean, variance or standard deviation of activations of the preceding layer based on a result of feeding data through the neural network in response to determining that the preceding layer is not the result of a residual connection.

25. A non-transitory processor-readable storage medium having stored thereon processor-executable instructions to cause a processor of a computing device to perform operations comprising:
performing approximation operations on a weights tensor associated with a layer of a neural network to generate an approximation weights tensor;
determining an expected output error of the layer in the neural network due to the approximation weights tensor;
subtracting the expected output error from a bias parameter of the layer to determine an adjusted bias parameter;
substituting the adjusted bias parameter for the bias parameter in the layer;
repeating operations of performing approximation operations on the weights tensor associated with a layer of the neural network, determining an expected output error of the layer of the neural network, subtracting the expected output error from a bias parameter of the layer to determine an adjusted bias parameter, and substituting the adjusted bias parameter for the bias parameter in the layer for one or more layers in the neural network to generate the approximation neural network; and
outputting an approximation neural network suitable for execution on a resource limited processor.

26. The non-transitory processor-readable storage medium of claim 25, wherein the stored processor-executable instructions are further to cause a processor of a computing device to perform operations such that determining an expected output error of the layer in the neural network due to the approximation weights tensor comprises determining an approximation weights tensor error based on a difference between an original weights tensor and the approximation weights tensor.

27. The non-transitory processor-readable storage medium of claim 25, wherein the stored processor-executable instructions are further to cause a processor of a computing device to perform operations such that determining an expected output error of the layer in the neural network comprises:
for each preceding layer that provides input to the layer:
determining whether the preceding layer includes an activation function after batch normalization; and
determining an expected input of the layer based on learnable batch normalization parameters of the preceding layer in response to determining that the preceding layer does not include an activation function after batch normalization.

28. The non-transitory processor-readable storage medium of claim 25, wherein the stored processor-executable instructions are further to cause a processor of a computing device to perform operations such that determining an expected output error of the layer in the neural network comprises:
> for each preceding layer that provides input to the layer:
> > determining whether the preceding layer includes an activation function after batch normalization;
> > determining whether the activation function is a clipped linear activation function in response to determining that the preceding layer includes an activation function after batch normalization; and
> > applying rules for truncated normal distributions adapted to account for a probability mass outside of a clipped range in response to determining that the activation function is a clipped linear activation function.

29. The non-transitory processor-readable storage medium of claim 25, wherein the stored processor-executable instructions are further to cause a processor of a computing device to perform operations such that determining an expected output error of the layer in the neural network comprises:
> for each preceding layer that provides input to the layer:
> > determining whether the preceding layer includes batch normalization; and
> > determining whether the preceding layer is a result of a residual connection in response to determining that the preceding layer does not include batch normalization; and
> > determining the preceding layer's expected output based on the equation $E[x_{out}]=E[x_{in}]+E[x_{last}]$ for each preceding layer that provides input to the layer in response to determining that the preceding layer is the result of a residual connection.

* * * * *